United States Patent [19]

Gillet et al.

[11] 4,406,960
[45] Sep. 27, 1983

[54] LAMINATED MAGNETIC CIRCUIT STATOR WITH CLAMPING FINGERS FOR A ROTATING ELECTRODYNAMIC MACHINE, NOTABLY OF THE IMMERSED BULB TYPE

[75] Inventors: Roger Gillet, Belfort; Yves Laumond, Andelnans, both of France

[73] Assignee: Alsthom-Atlanatique, Paris, France

[21] Appl. No.: 407,412

[22] Filed: Aug. 12, 1982

[30] Foreign Application Priority Data

Sep. 24, 1981 [FR] France ............................ 81 18035

[51] Int. Cl.³ ............................................. H02K 1/16
[52] U.S. Cl. ................................... 310/217; 310/258
[58] Field of Search ............. 310/216, 217, 218, 254, 310/258, 259

[56] References Cited

U.S. PATENT DOCUMENTS 3,099,760  7/1963  Hoffmann .......................... 310/259
3,237,035  2/1966  Hoffmann .......................... 310/258
3,260,875  7/1966  Evans ................................ 310/258

Primary Examiner—J. D. Miller
Assistant Examiner—D. L. Rebsch
Attorney, Agent, or Firm—Sughrue, Mion, Zinn, Macpeak & Seas

[57] ABSTRACT

A laminated magnetic circuit stator with clamping fingers for a rotating electrodynamic machine, notably of the immersed bulb type. The force clamping the sheets (T1, T4) of the stator magnetic circuit is transmitted to clamping fingers (1) by radial levers (2) bearing on the shell (10) and subject, further from the stator axis, to a longitudinal thrust transmitted by bars (4) bearing on the shell beyond the heads (16) of the stator winding bars.

7 Claims, 3 Drawing Figures

LAMINATED MAGNETIC CIRCUIT STATOR WITH CLAMPING FINGERS FOR A ROTATING ELECTRODYNAMIC MACHINE, NOTABLY OF THE IMMERSED BULB TYPE

FIELD OF THE INVENTION

The present invention concerns a laminated magnetic circuit stator with clamping fingers for a rotating electrodynamic machine, notably of the immersed bulb type.

BACKGROUND OF THE INVENTION

A stator of this kind is in the overall form of a body of revolution about the axis of the machine, this axis defining the "longitudinal" direction hereinafter referred to. It comprises, in a manner known per se, a magnetic circuit consisting of a stack, along the longitudinal direction, of thin metal sheets forming circular rings in transverse planes. The inner edge of the sheets is formed with angularly distributed notches to accommodate stator winding bars, the remaining sheet between two angularly successive notches constituting a tooth projecting radially inwards. The solid part of the sheets externally of the notches forms a "magnetic ring" conducting the stator magnetic flux in the circumferential direction.

This stack is clamped up by means of clamping fingers distributed angularly at both ends so as to exert a clamping pressure on the ring and each of the teeth. Each of these fingers is in the form of a strip of sheet metal having a radial length, a longitudinal height and a tangential thickness, an external part of the length of the finger extending over the magnetic ring and an internal part over one only of the teeth.

The clamping force is applied to these fingers by longitudinal rods which pass through the entire stack and to the ends of which nuts are fitted. These rods may not be placed in the teeth of the magnetic circuit, even if they are insulating, because of the necessity to retain a sufficient cross-section for the passage of the magnetic flux conducted by these teeth.

Thus they are always disposed in the ring. Unfortunately, in the case of many bulb sets, the height of this ring as measured radially is less than the depth of the notches. As a result, the clamping force applied to the fingers by these rods is incorrectly distributed by the fingers: the clamping pressure is too high on the magnetic ring and too low on the teeth. Also, irrespective of their position these rods are subject to induced current losses if they are of metal and reduce the magnetic steel cross-section available for the passage of the stator magnetic flux.

Finally, it is not a simple matter to maintain the clamping force, which tends to decrease with time in service, by virtue of the difficulty of access to the nuts. The space at the two ends of the magnetic surface is congested through the presence of the stator winding heads.

The objective of the present invention is to provide a laminated magnetic circuit stator with clamping fingers for a rotating electrodynamic machine, notably of the immersed bulb type, this stator overcoming the disadvantages of the clamping rods and providing a simple means for selecting the best distribution of the clamping force between the teeth and the magnetic ring and for checking and reclamping the magnetic circuit without any dismantling of the machine, this without creating undesirable bulk.

SUMMARY OF THE INVENTION

The invention consists in a laminated magnetic circuit stator with clamping fingers for a rotating electrodynamic machine, notably of the immersed bulb type, the circuit having a longitudinal axis coincident with that of the machine and comprising:

a magnetic circuit consisting of a stack, along the longitudinal direction, of thin metal sheets forming circular rings in transverse planes, the inner edge of these sheets being formed with angularly distributed notches, the remaining sheet between two angularly successive notches constituting a tooth projecting radially inwards, the solid part of the sheets externally of the notches forming a "magnetic ring" conducting the stator magnetic flux in the circumferential direction, the height of this ring as measured radially being possibly less than the depth of the notches also measured radially, winding bars housed in these notches with their heads projecting longitudinally beyond each side of the stack, "clamping" fingers distributed angularly over the two ends of the stack to distribute clamping forces over the ring and each tooth, each of these fingers having a radial length, a longitudinal height and a tangential thickness, an external part of the length of the finger extending over said magnetic ring and an internal part over one only of said teeth, bearing means on each side of the stack to apply said clamping force to each of the fingers, a shell surrounding the magnetic circuit and consisting of a thick cylinder of sheet metal projecting longitudinally beyond each side of the stack and the winding heads, and engagement means for engaging the outer edge of the magnetic sheets with the internal surface of the carcass.

The circuit is characterized in that each of the fingers is provided with a finger shaft to receive a clamping force, the direction of this shaft being circumferential, and the radial position of this shaft enabling the finger to distribute the clamping force between the magnetic ring and the tooth, said bearing means for applying the clamping force comprising, at one end at least of the magnetic circuit:

a clamping lever extending radially opposite each tooth and having an external pivot bearing on a proximal support fastened to the carcass in the vicinity of the clamping finger, an intermediate pivot and an internal pivot bearng on said finger shaft, and longitudinal thrust transmitting rods each with a proximal end bearing on the intermediate pivot of at least one clamping lever and a distal end disposed beyond the heads of the stator winding bars and bearing longitudinally and in an adjustable manner on a distal support fastened to the shell to apply a longitudinal thrust to the intermediate pivot and so that the clamping lever transmits a fraction of this thrust to the finger shaft, offsetting it towards the stator axis to constitute said clamping force.

For preference, said intermediate pivots of the clamping levers are loaded in thrust through the intermediary of thrust distribution bars extending circumferentially and each common to a number of the levers which each apply a clamping force to one tooth, each of the distribution bars being loaded in thrust by two of said thrust transmitting rods disposed one on each side of the center of the bar so as to permit temporary application of a positive longitudinal thrust to the bar by an actuator disposed longitudinally between the two rods and adapted to exert an accurately known thrust while bearing on a far support formed on the carcass at a distance from the magnetic circuit.

The manner in which the invention may be implemented will be described hereinafter by way of non-limiting example and with reference to the accompanying diagramatic drawings. It should be understood that the parts described and shown may, without departing from the scope of the invention, be replaced by other parts having the same technical function. Where a part appears in more than one Figure it is designated by the same reference symbol in each.

DESCRIPTION OF THE PREFERRED EMBODIMENT

Figure 1:
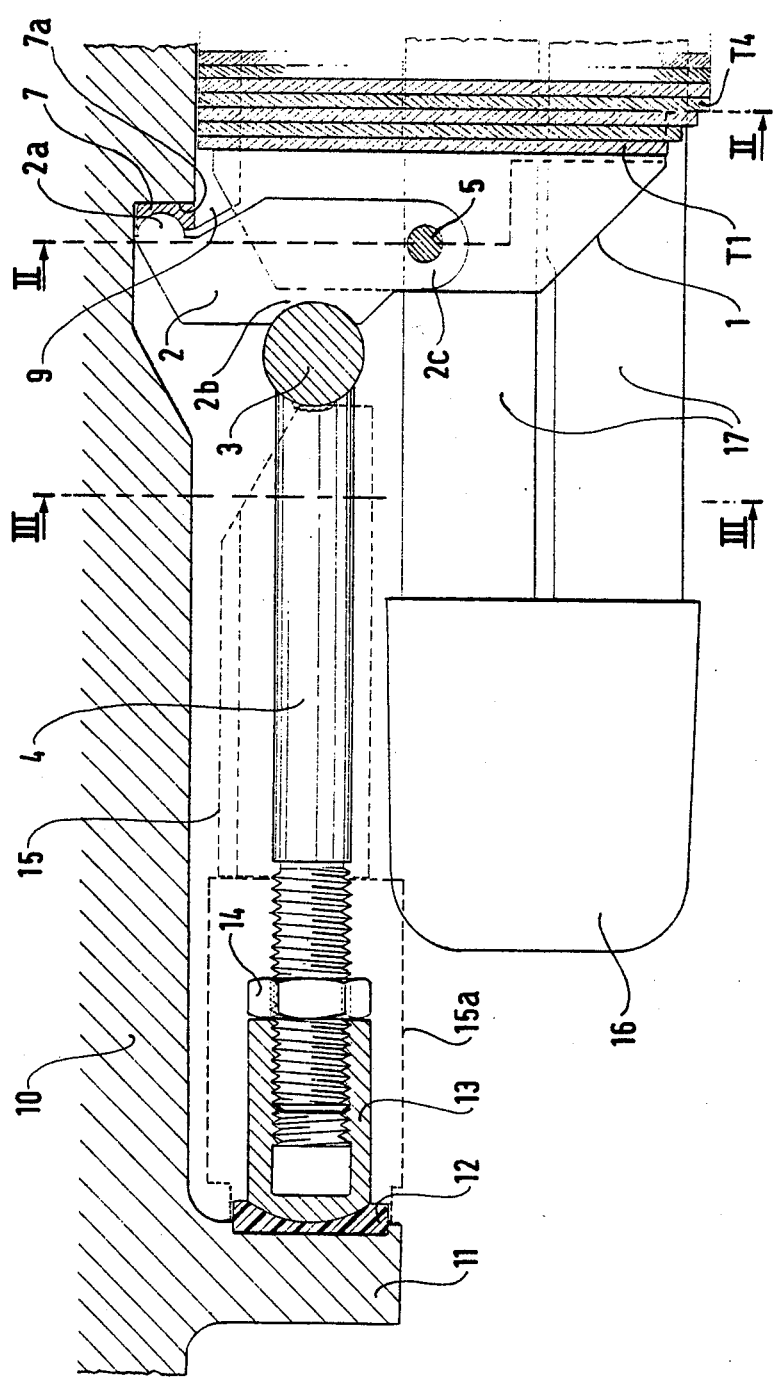
FIG. 1 is a view of a portion of a stator in accordance with the invention, in cross-section on a plane through the axis of the machine.
Figure 2:
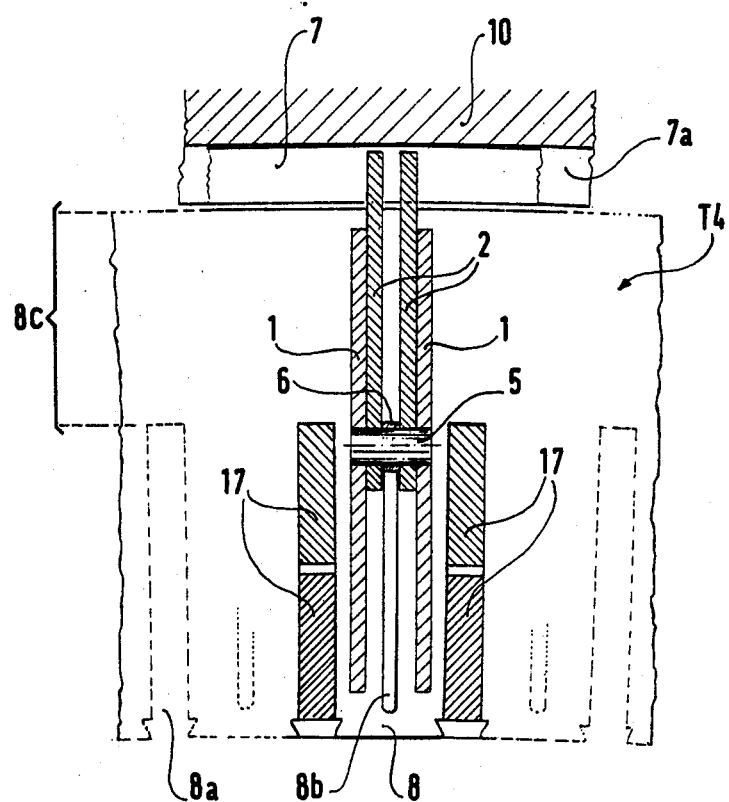
FIG. 2 is a view of the same stator portion in cross-section on transverse planes on the line II—II in FIG. 1.
Figure 3:
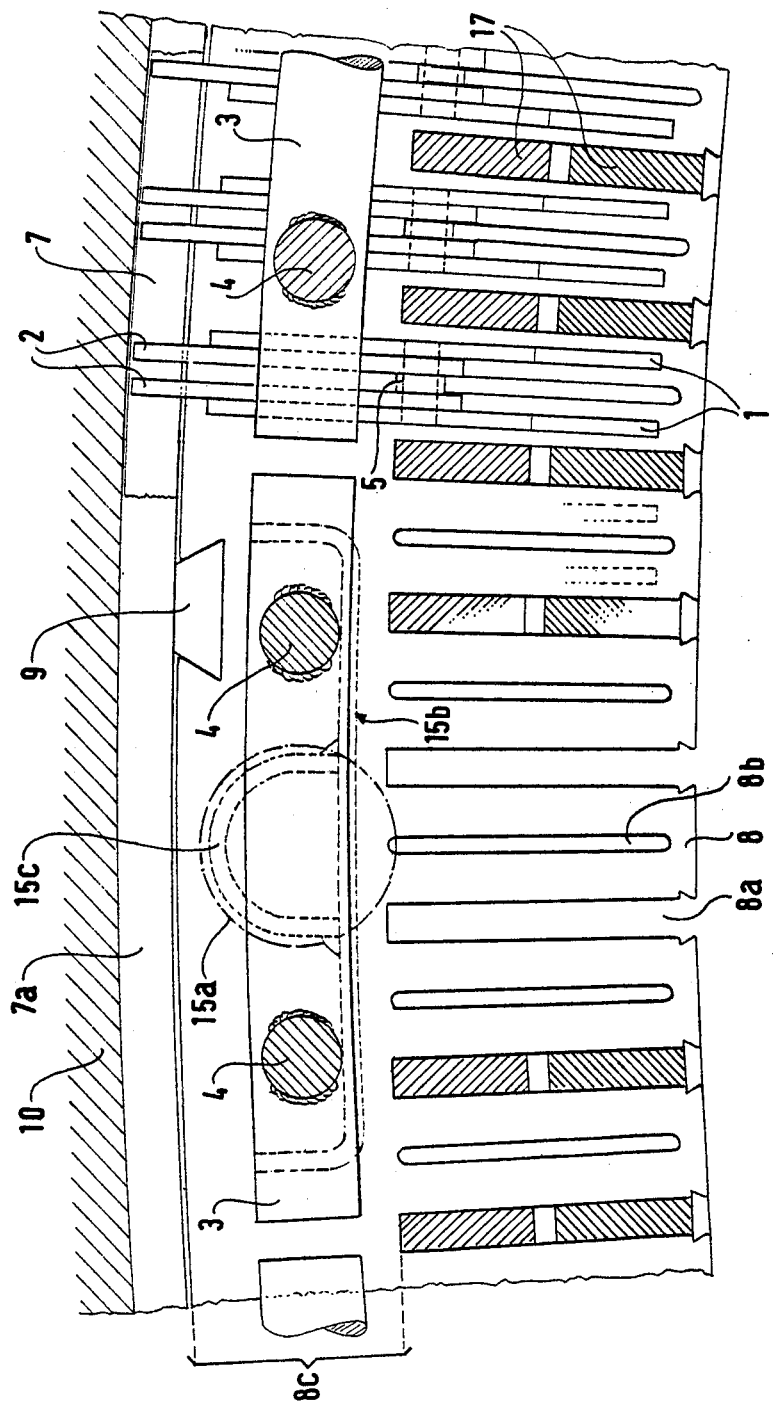
FIG. 3 is a view of the same stator portion in cross-section on the transverse plane III—III in FIG. 1, the clamping fingers and levers being removed in part of this figure and three end sheets of the magnetic circuit being removed in the whole figure so as to facilitate the understanding of the diagram.

First the reference numerals of the parts shown in these figures will be indicated
1: Clamping finger (there are two fingers per tooth, each consisting of a cut-out sheet disposed in a longitudinal radial plane)
2: Clamping lever comprising two flat cut-out radial longitudinal sheets with end pivot 2a, intermediate pivot 2b and internal pivot 2c
3: Thrust distribution bar
4: Thrust transmitting rod
5: Finger shaft whereby the fingers bear on internal pivot 2c of lever 2
6: Spacer maintaining separation between the two sheets of lever 2
7: Bar whereby lever 2 bears on carcass 10, retained radially by the end of keys 9 in a groove of which one flank 7a constitutes said "proximal" support
T1,T4: Packets of stator magnetic sheets, a few packets of end sheets T1, T2, T3 having their internal edges stepped back so as to improve the distribution of magnetic flux
8: Magnetic sheet teeth
8a: Notches between teeth
8b: Vent hole formed on teeth axis between two clamping fingers
8c: Magnetic circuit ring
9: Longitudinal key for mutual solidarization and engagement of the sheets to the shell, this key constituting an "engagement means"
10: Stator shell
11: Bearing ring projecting from carcass and constituting said "disatal" support
12: Bearing plate on ring 11, constituting an insulating intermediate member
13: Dome nut screwing onto far end of rod 4 to constitute said "adjustable support"
14: Locknut for nut 13
15: Clamping apparatus which, by virtue of an actuator 15a, establishes or re-establishes the clamping force which is then maintained by locking nut 13
16: Stator winding head
17: Winding bar For each tooth 8 clamping is effected by virtue of two fingers 1 disposed radially one on each side of a possible vent channel 8b and receiving a longitudinal clamping force on a shaft 5.

By virtue of the low height of ring 8c as compared with the depth of notches 8a, the optimum radial position of this shaft coincides with the winding bars and heads 17 and 16, which prevent longitudinal thrust members being placed in this position.

For this reason fingers 1 are pivoted to a lever 2 through the intermediary of shaft 5. This lever bears on carcass 10 through the intermediary of a strip 7 serving as a support for a number of pairs of sheets (five pairs in this example) each constituting a lever. The two sheets associated with the two clamping fingers are held apart by a spacer 6. Clamping fingers 1 and levers 2 may be cut out from sheet steel.

For each tooth the associated lever 2 is loaded in thrust by a thrust distribution bar 3 common to a number of levers (five in this example). The force with which bars 3 thrust on the levers is imparted to each bar by two thrust transmitting rods 4. Bar 3 is permanently coupled to rods 4, by welding, for example.

Rods 4 bear on a ring 11 coupled to shell 10 remotely of the magnetic circuit, through the intermediary of an insulating plate 12 of laminated impregnated fiber glass. clamping adjustment is effected by means of a dome nut 13 which screws onto the rods and bears on the plate. A locknut 14 sets the adjustment.

The magnetic circuit is clamped either by exerting a torque on nut 13 at the end of transmission rods 14 using a torque wrench, or in an overall manner and more precisely using apparatus and actuators.

The apparatus 15 for clamping by means of an actuator 15a comprises a plate 15b folded at its two ends and carrying a central stiffener 15c. On one side it bears on bar 3 at four points, providing good distribution of the loads on said bar. On the other side and at its center it bears on the actuator. The latter bears on ring 11.

By increasing the number of actuators (in this example one actuator per five teeth) and plates it is possible to clamp up the entire magnetic circuit simultaneously. Once the required pressure is achieved, nuts 13 bearing on ring 11 are locked by means of locknuts 14. The actuators and apparatus 15 may then be removed.

For a stator of a bulb set having an external diameter of 5.550 mm, a magnetic ring height of 70 mm and a notch depth of 105 mm, the thrust transmitting bars 4 may, for example, be 260 mm long and each exert a force of 44.350 N, the force reduction ratio of levers 2 being 0.4, for example, and the shafts of fingers 5 being 78 mm from the external edge of sheets T1, T4.

We claim:
1. A laminated magnetic circuit stator with clamping fingers for a rotating electrodynamic machine, notably of the immersed bulb type, the circuit stator having a longitudinal axis coincident with that of the machine and comprising:
 a magnetic circuit consisting of a stack, along the longitudinal direction, of thin metal sheets (T4) forming circular rings in transverse planes, the inner edge of these sheets being formed with angu- larly distributed notches (8a), the remaining portion of the sheet between two angularly successive notches constituting a tooth (8) projecting radially inwards, the solid part of the sheets externally of the notches forming a "magnetic ring" (8c) conducting the stator magnetic flux in the circumferential direction, the height of said ring as measured radially being possibly less than the depth of the notches also as measured radially, winding bars (17) housed in said notches with their heads (16) projecting longitudinally beyond each side of the stack, clamping fingers (1) distributed angularly over the two ends of the stack to distribute clamping forces over the ring and each tooth, each of said fingers having a radial length, a longitudinal height and a tangential thickness, an external part of the length of the finger extending over said magnetic ring and an internal part over one only of said teeth, bearing means on each side of the stack to apply said clamping force to each of the fingers, a shell (10) surrounding the magnetic circuit and consisting of a thick cylinder of sheet metal projecting longitudinally beyond each side of the stack and the winding heads, and engagement means (9) for engaging the outer edge of the magnetic sheets with the internal surface of the shell, the improvement wherein for the circuit, each of the fingers is provided with a finger shaft (5) to receive a clamping force, the longitudinal direction of said shaft being circumferential, the radial position of said shaft enabling the finger to distribute the clamping force between the magnetic ring (8c) and the tooth (8), said bearing means for applying the clamping force comprising, at one end at least of the magnetic circuit;

a clamping lever (2) extending radially opposite each tooth (8) and having an external pivot (2a) bearing on a proximal support (7a) fastened to the shell (10) in the vicinity of the clamping finger (1), an intermediate pivot (2b) and an internal pivot (2c) bearing on said finger shaft (5), and longitudinal thrust transmitting rods (4) each with a proximal end bearing on the intermediate pivot (2b) of at least one clamping lever (2) and a distal end disposed beyond the heads (16) of the stator winding bars and bearing longitudinally and in an adjustable manner on a distal support (11) fastened to the shell to apply a longitudinal thrust to the intermediate pivots so that the clamping lever transmits a fraction of said thrust to the finger axis (5), offsetting it towards the stator axis to constitute said clamping force.

2. A stator according to claim 1, wherein said intermediate pivots (2b) of the clamping levers (2) are loaded in thrust through the intermediary of thrust distribution bars (3) extending circumferentially and each common to a number of the levers which each apply a clamping force to one tooth (8), each of the distribution bars being loaded in thrust by two of said thrust transmitting rods (4) disposed, one on each side of the center of the bar, and an actuator disposed longitudinally between the two rods and adapted to exert an accurately known thrust while bearing on a distal support formed on the shell at a distance from the magnetic circuit so as to permit temporary application of a positive longitudinal thrust to the bar.

3. A stator according to claim 2, wherein each of the thrust transmitting rods (4) bears on said distal support (11) through the intermediary of a system comprising a screw and nut (13) adjustable in length on operation of said actuator and lockable following adjustment so as to permit removal of the actuator without risk of significant reduction in the clamping force, and wherein the nut of said system is disposed longitudinally beyond the winding heads (16) to permit easy access.

4. A stator according to claim 3, wherein said proximal supports consist of a groove (7a) formed in the internal surface of the shell (10), said distal supports (11) consisting in a projection formed on said same internal surface.

5. A stator according to claim 1, wherein the thrust transmitting rods (4) are of steel, are welded to the thrust distribution bars (3) and bear on said distal supports (11) through the intermediary of insulating members preventing currents induced by the winding heads flowing through two consecutive rods welded to the same bar and a part of the shell (10) between the far supports.

6. A stator according to claim 1, wherein each of said teeth (8) is formed with a cooling vent (8b) in the form of a slot extending along a radial axis of the tooth, and wherein a clamping finger (1) lies on each side of each vent via a common finger shaft (5), with said internal pivot (2c) of the respective lever (2) bearing on the finger shaft between the two fingers.

7. A stator according to claim 3, wherein each of the thrust distribution bars (3) extends lengthwise in the shape of a circular arc centered on the stator axis, and the thrust transmitting rods (4) being positioned so as to balance the forces applied to the bar by the rods and the levers (2) so as to avoid any bending of these rods.

* * * * *